E. P. BAUM.
OIL FILTER.
APPLICATION FILED OCT. 28, 1913.

1,135,150.

Patented Apr. 13, 1915.
4 SHEETS—SHEET 3.

WITNESSES
J.W. Wells
C. Bradway.

INVENTOR
Edwin P. Baum
BY Munn & Co
ATTORNEYS

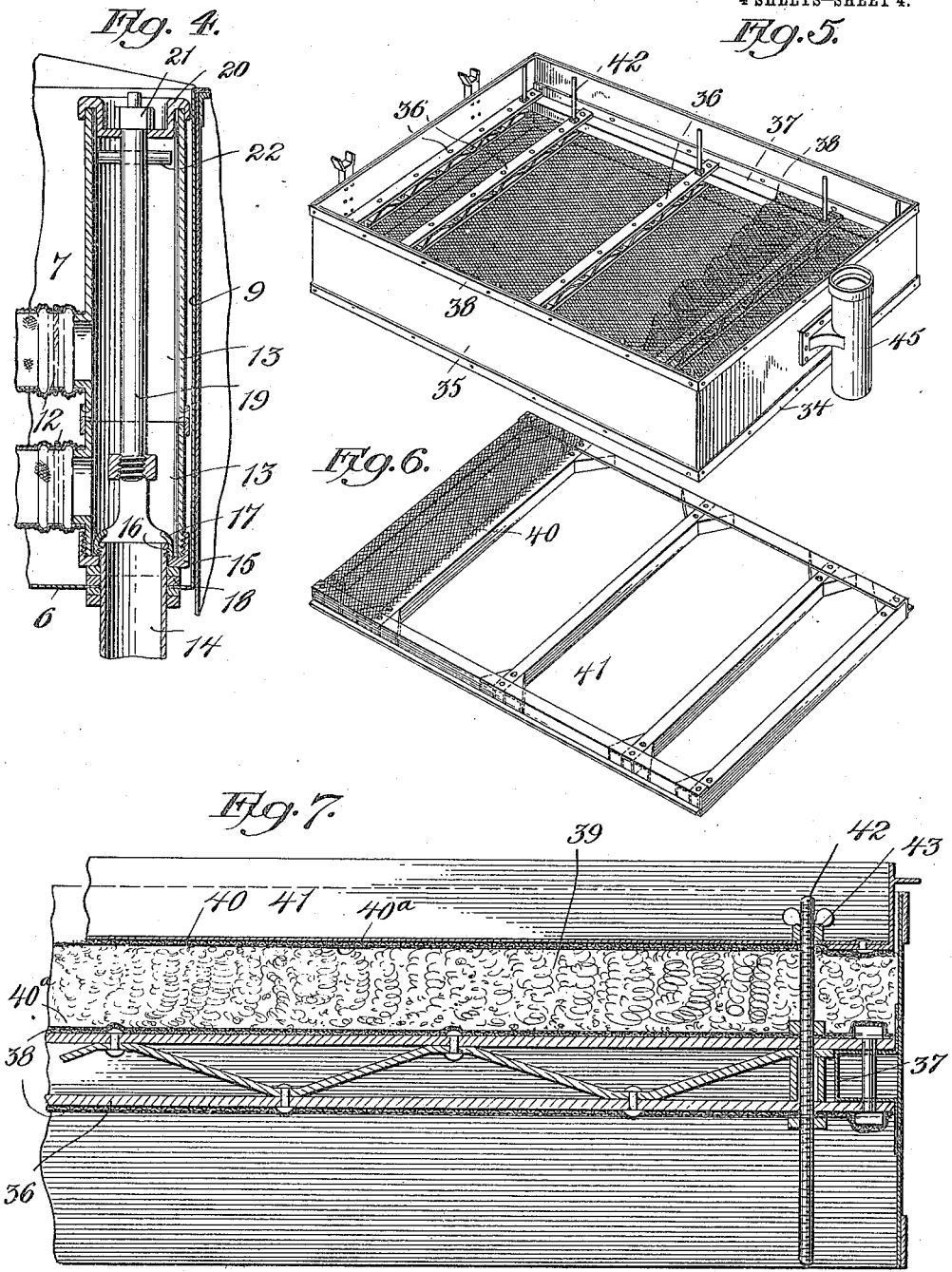

UNITED STATES PATENT OFFICE.

EDWIN PRESTON BAUM, OF KEOKUK, IOWA.

OIL-FILTER.

1,135,150. Specification of Letters Patent. Patented Apr. 13, 1915.

Application filed October 28, 1913. Serial No. 797,765.

*To all whom it may concern:*

Be it known that I, EDWIN P. BAUM, a citizen of the United States, and a resident of Keokuk, in the county of Lee and State of Iowa, have invented a new and Improved Oil-Filter, of which the following is a full, clear, and exact description.

This invention relates to a filter for filtering large quantities of oil and is adapted for use in connection with machine shops or other plants consuming considerable oil.

The invention has for its general objects to improve and simplify the construction and operation of filters of the character referred to so as to be reliable and efficient in use, so designed as to filter from the oil the minutest particles it may contain, and including filtering elements which can be readily taken out of the tank or body of the filter for the purpose of cleaning or renewing.

A specific object of the invention is the provision of a filter having novel preliminary and final filtering elements so related that the oil in passing through the preliminary elements has the coarser particles separated therefrom, and in passing through the final filtering elements has the finer particle removed, the oil passing through a body of water in transit from the preliminary to the final filtering elements.

Another object of the invention is the provision in the bottom of the tank or body of the filter of a novel structure forming by its exterior a deflector along which the oil from the preliminary filtering means passes through the cleansing water to the final filtering elements, while the interior of the structure constitutes a settling chamber in which the oil after being washed is maintained in a quiet state so that particles can settle therefrom into the water in the bottom of the tank, whereby the final filtering elements will be kept in operative condition or unclogged a longer time than if provision were not made for settling of the particles from the oil.

A further object of the invention is to provide a simple, effective and novel construction of filtering element which is a unitary structure capable of being readily removed from the tank and easily taken apart for cleansing.

With such objects in view, and others which will appear as the description proceeds, the invention comprises various novel features of construction and arrangement of parts which will be set forth with particularity in the following description and claims appended hereto.

Figure 1:
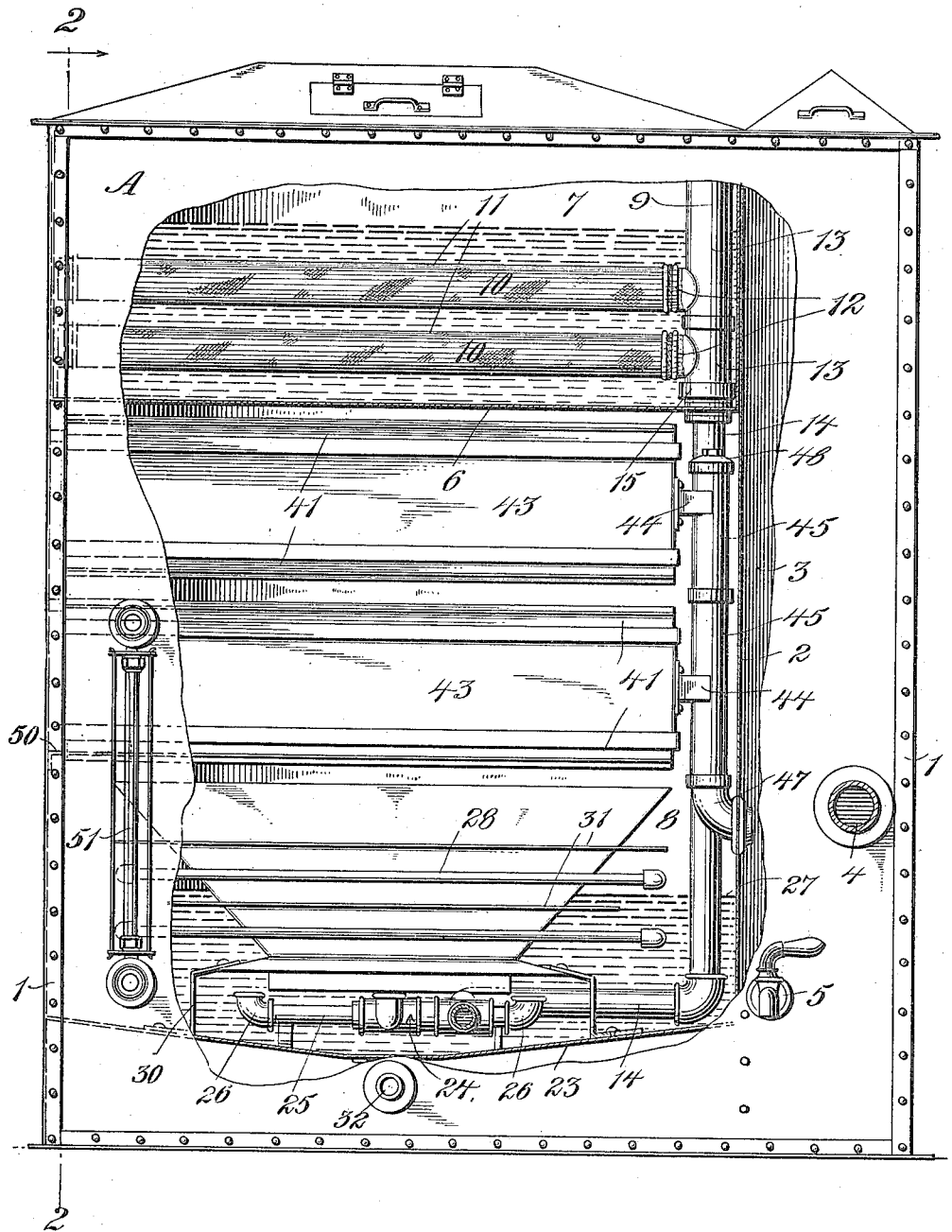
Figure 2:
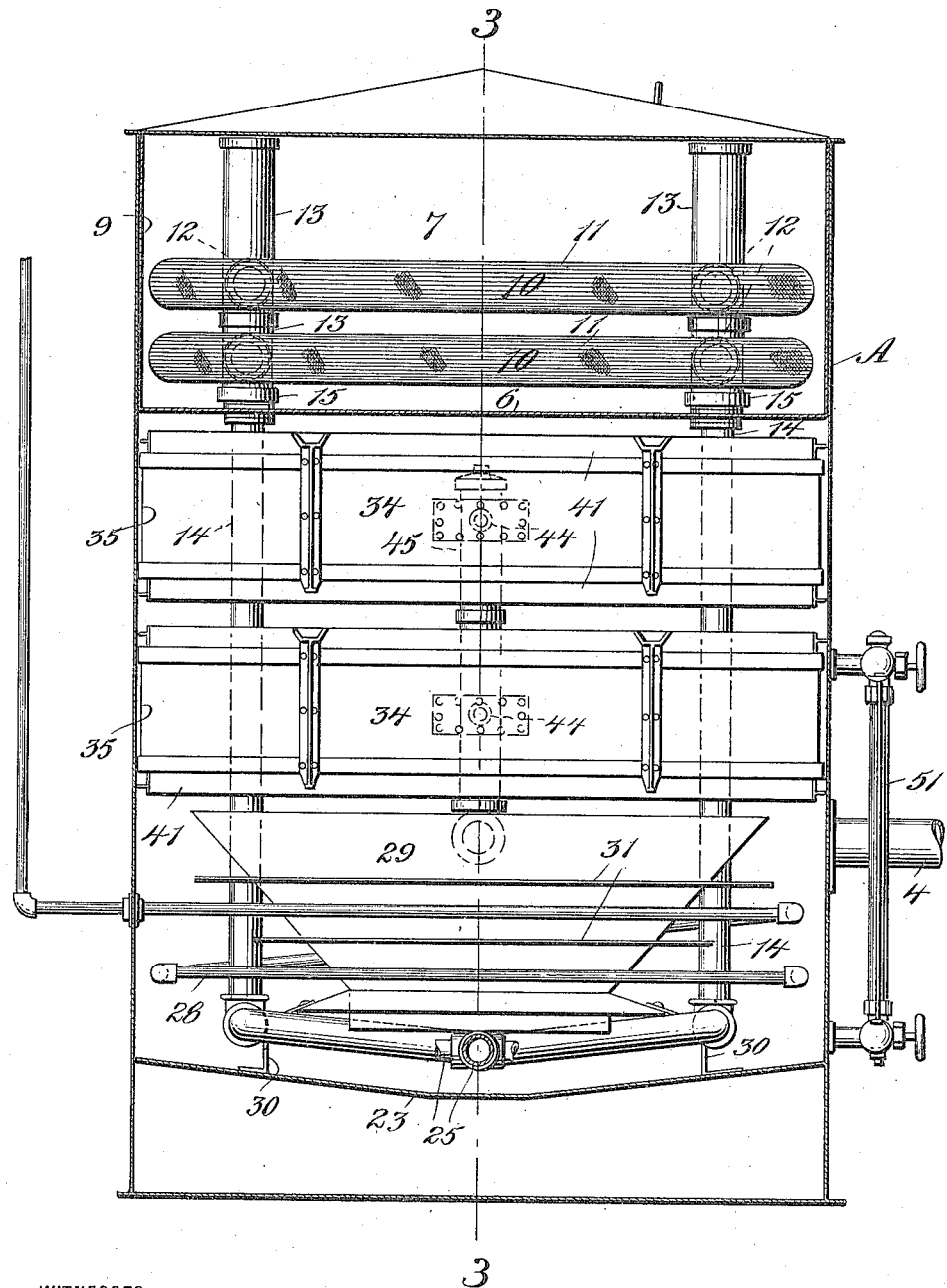
Figure 3:
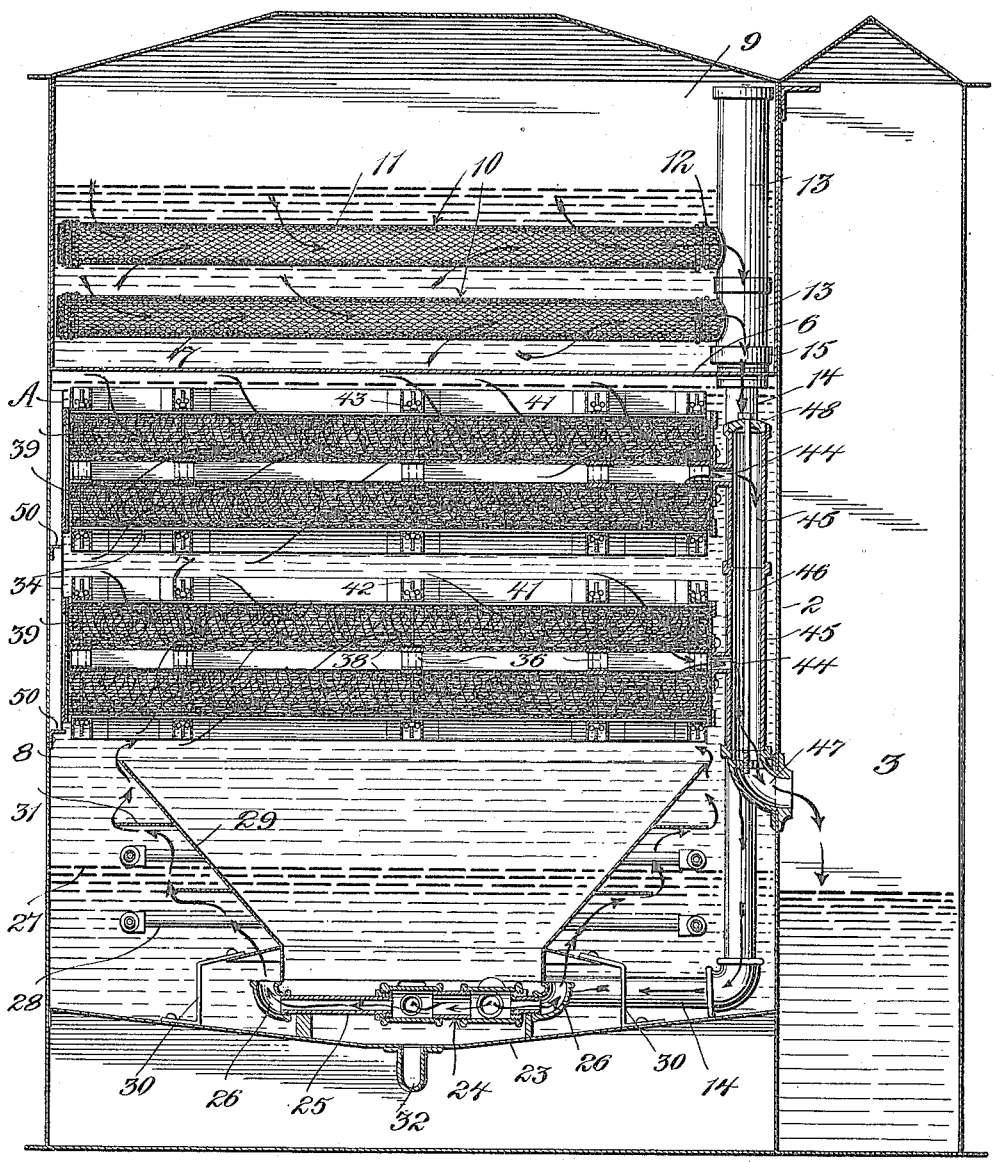

In the accompanying drawings, which illustrate one embodiment of the invention, and wherein similar characters of reference indicate corresponding parts in all the views, Figure 1 is a front view of the filter with a portion of the front wall of the tank broken away to illustrate the internal construction; Fig. 2 is a vertical section on the line 2—2 of Fig. 1; Fig. 3 is a vertical section on the line 3—3 of Fig. 2; Fig. 4 is an enlarged sectional view of the connections between the preliminary filtering elements and the discharge pipe therefor; Fig. 5 is a perspective view of the box of one of the final filtering elements with parts of the latter assembled in the box; Fig. 6 is a perspective view of the plate or frame used in the top and bottom of the box; and Fig. 7 is an enlarged sectional view showing the clamping means for securing the parts of the final filtering elements together.

Referring to the drawing, A designates a tank of sheet metal or other construction having reinforcing angle-irons 1 fastened to the edges for stiffening the structure. The tank, which may be of any desired shape and size, has a vertical partition 2 adjacent one side so as to form between it and the adjacent side wall a reservoir or storage compartment 3 into which the filtered oil is delivered and from which it can be drawn off through a pipe 4 to the machinery to be lubricated, or drawn off for local use through a faucet 5. The rest of the tank is divided by a horizontal partition 6 closer to the top than to the bottom, into an upper receiving or preliminary filtering compartment 7, and a lower final filtering compartment 8, so that oil supplied to the compartment 7 will be subjected to a preliminary filtering and thence conveyed to the lower compartment, where it is subjected to a washing and final filtering action. Preferably, however, the partition 6 is removable and constitutes the bottom of a pan 9 which is of such size as to just fit in the tank. The oil to be filtered is poured into this pan and the heavy particles of foreign matter in the oil settle upon the bottom of the tank. Within the pan are a plurality of filtering elements 10 disposed one above another, or in any other suitable arrangement, it being essential, however, that these filtering elements be supported suitably above the bottom of the pan so that they will not become clogged with the matter that settles by gravitation in the pan. Each filtering element 10 comprises a hollow, shallow boxlike body made of wire screen material, and on the exterior thereof is a covering of cloth or other suitable material having a fine mesh to separate the particles from the oil. The oil is free to enter each filtering element from the top, bottom, sides and ends. Each filtering element has an outlet 12 which is connected with a coupling 13. The coupling 13 of the upper filtering element 10 slips into engagement with the coupling of the lower filtering element, as shown in Fig. 4, and suitable fastening means is provided so as to secure the elements together in such a manner that the elements can be detached for the purpose of cleaning the filtering cloth thereof or providing new cloth. The bottom of the pan, as shown in Fig. 4, is provided with one or more downwardly conducting discharge pipes 14 each having a coupling 15 arranged within the pan for receiving the T-coupling 13 of the lower filtering element 10. The upper end of each pipe 14 has an external thread 16 on which screws a clamping ring or nut 17 whereby the coupling 15 is clamped against the upper one of the nuts 18 that fastens the pipe 14 to the bottom of the pan. This clamping nut or ring 17 is provided with a rod or stem 19 which leads upwardly through the couplings 13 to the top of the upper coupling, the upper coupling being fitted with a cap 20 through which the stem 19 extends. On the outer end of the stem is a nut 21 which screws down against the cap and thereby forces the couplings 13 together, and against the bottom coupling 15 so that liquid-tight joints are formed. By removing the nut 21 and cap 20 access is afforded to means on the stem whereby the latter can be turned, such means being oppositely-disposed lugs 22 with which a spanner or other instrument can be engaged.

The pipe or pipes 14 which extend down to the dished bottom 23 of the tank is connected with a distributer 24 which has a plurality of radiating arms 25 terminating in upwardly-discharging nozzles or outlets 26. By means of this distributer 24 the oil that has gone through a preliminary filtering is discharged into a body of water which fills the bottom of the tank to the level designated 27, Fig. 3, whereby the oil in rising through the water is washed. This water may be kept heated by means of a steam-heating coil 28, so as to render the oil more fluid and thereby enable it to give up more freely the particles of foreign matter contained therein.

After the oil is washed it should be allowed to remain in a quiescent state so that particles of foreign matter therein which have not been eliminated by the first filtering operation can settle in the bottom of the tank. For this purpose a combined settling chamber and oil deflector is mounted in the bottom of the tank. This structure comprises a frusto-pyramidal, conical or other body 29 which is supported in inverted position on legs or brackets 30 secured to the bottom of the tank. The upper end of the settling chamber formed by the body 29 is slightly smaller than the horizontal dimensions of the tank, so that the oil in rising will flow close to the outer walls of the tank, and as a result the oil at the center of the filtering chamber will be in a more or less quiescent state, so that settling can take place effectively. On the exterior of the settling chamber are horizontally disposed deflectors or fins 31 which cause the oil rising from the distributer 24 to form into sheets in traveling upwardly through the water, whereby the water has a better cleaning action. In the bottom of the tank is a drain outlet 32 from which the sediment can be drawn off with the water in the tank when a supply of clean water is needed. The bottom of the settling chamber is open, but the outlet openings 26 of the distributer 24 are disposed outwardly from the lower open end of the settling chamber so that there is no danger of oil rising in the latter and causing the oil to become agitated.

Final filtering elements 34 are disposed in the tank at a point above the settling chamber 29 and below the pan 9. Any desired number of final filtering elements may be employed, but in the present instance two are shown. Each filtering element 34 comprises a box-like structure 35 open at its top and bottom, as shown in Figs. 3, 5 and 7. Extending transversely of this body 35 are trussed bars 36 having their ends bolted or otherwise secured to internal flanges or ledges 37 on the walls of the box. These bars serve to support and separate sheets of wire screen 38, and on these screens are held layers 39 of waste, excelsior or other filtering material, and on these layers are outer sheets of screen material 40, such screens 40 being fastened to rectangular frames 41 constructed as shown in Fig. 6. These frames 41 fit into the top and bottom of each box 35 and are held in place by threaded rods 42 extending vertically through the ends of the trussed bars 36, there being clamping nuts 43 on the threaded rods so that the outer frames 41 can be forced inwardly to compress the filtering material 39. If desired, the screens 38 and 40 may be covered with cloth 40ª, and the oil will have to pass through the cloth and filter out some of the foreign matter. By this construction it will be observed that each filtering element or box has a central chamber disposed between the filtering material 39, and the oil to be filtered passes into the box through the filtering material to the central chamber. These central chambers have connections at 44 with couplings 45, which couplings interfit as shown in Fig. 3 and are fastened together by a rod or bolt 46 passing through the couplings 45. The coupling 45 of the lower filtering box is connected with an elbow 47 which discharges the filtered oil into the storage reservoir 3. The lower end of the clamping rod 46 is screwed into or otherwise connected with the coupling 47, while the upper end of the rod passes through a cap 48 in the upper coupling 45. By removing the pan 9 this coupling rod 46 can be reached so as to be unscrewed and taken out, and when this is done the filtering boxes can be lifted out of the tank for the purpose of cleaning or renewing the filtering material. These boxes are supported on ledges or other supports 50 arranged within the tank, and space is provided around the box at all sides for the oil to pass upwardly around and between and over the boxes, so that oil can enter each box from the top and bottom.

To determine the level of the water in the tank the same may be provided with a sight glass or gage 51 of ordinary construction.

While I have described the principle of operation, together with the apparatus which I now consider to be the best embodiment thereof, I desire to have it understood that the apparatus shown is merely illustrative, and that such changes may be made when desired as are within the scope of the appended claims.

Having thus described my invention, I claim as new and desire to secure by Letters Patent:

1. A filter comprising a chamber for containing oil to be filtered, a plurality of horizontally disposed filtering element arranged within the chamber, interfitting couplings on the elements forming together an outlet for the filtered oil, and means within the couplings for securing the same together.

2. In a filter, the combination of a chamber for containing oil to be filtered, a filtering element therein, and means for conveying away the filtered oil from the element, said filtering element comprising a box, sheets of screen material disposed within the box and spaced apart to form a chamber for receiving the filtered oil, filtering material covering the said sheets, frames disposed at opposite sides of the filtering material, and means for drawing the frames together for holding the filtering material compressed in the box.

3. A filtering element for filters, comprising a frame, trussed bars disposed therein, sheets of screen material laid on the opposite faces of the bars to form a chamber for receiving filtered oil, the filtering material covering the said sheets, and open-work frames clamped in the box for holding the filtering material compressed on the said sheets.

4. A filtering element for filters, comprising a box open at its top and bottom, foraminous sheets spaced apart in the box to form a chamber for receiving the filtered oil, filtering material covering the foraminous sheet, frames fitted in the top and bottom of the box and having foraminous sheets, and screw means for clamping the said frames in the boxes and compressing the filtering material therein.

In testimony whereof I have signed my name to this specification in the presence of two subscribing witnesses.

EDWIN PRESTON BAUM.

Witnesses:
E. L. SAUVE,
REN M. DAVIS.

Copies of this patent may be obtained for five cents each, by addressing the "Commissioner of Patents, Washington, D. C."